(12) United States Patent  (10) Patent No.: US 8,506,100 B2
Prendamano  (45) Date of Patent: Aug. 13, 2013

(54) HAT BRIM WITH REARVIEW MIRRORS

(76) Inventor: James Prendamano, Staten Island, NY (US)

( * ) Notice: Subject to any disclaimer, the term of this patent is extended or adjusted under 35 U.S.C. 154(b) by 247 days.

(21) Appl. No.: 12/836,773

(22) Filed: Jul. 15, 2010

(65) Prior Publication Data
US 2012/0014009 A1    Jan. 19, 2012

(51) Int. Cl.
*G02B 7/182* (2006.01)

(52) U.S. Cl.
USPC .................. 359/879; 359/880; 359/881

(58) Field of Classification Search
USPC ............................. 359/879, 880, 881
See application file for complete search history.

(56) References Cited

U.S. PATENT DOCUMENTS

| 582,724 | A |  | 5/1897 | Dromgoole |  |
|---|---|---|---|---|---|
| 736,418 | A |  | 8/1903 | Merrick |  |
| 1,504,344 | A |  | 8/1924 | Hennigh |  |
| 4,307,885 | A |  | 12/1981 | Pidcock |  |
| 4,490,012 | A |  | 12/1984 | Magiske |  |
| 5,842,931 | A |  | 12/1998 | Payne |  |
| 5,884,337 | A | * | 3/1999 | Dudley, Jr. | 2/209.14 |
| 6,808,278 | B1 |  | 10/2004 | Jirnov |  |
| 7,492,330 | B2 |  | 2/2009 | Hata |  |
| 2012/0014095 | A2 | * | 1/2012 | Waters | 362/106 |

FOREIGN PATENT DOCUMENTS

| CN | 2930356 | 8/2007 |
|---|---|---|
| JP | 2007308860 | 11/2007 |
| WO | WO2007/077588 | 7/2007 |

* cited by examiner

*Primary Examiner* — Jade R Chwasz
(74) *Attorney, Agent, or Firm* — Michael I. Kroll

(57) ABSTRACT

Rear view mirrors for use with a brim of a hat. Telescopic arms extend from the brim and are pivotable and swivelable from a central ball joint and have rear view mirrors disposed on the distal ends thereof that are pivotable and swivelable on the ball joints that transition from the distal end of the telescopic arms and the rear view mirrors. The rear view mirrors and telescopic arms are articulated by the user to provide the desired field of vision behind the user.

5 Claims, 10 Drawing Sheets

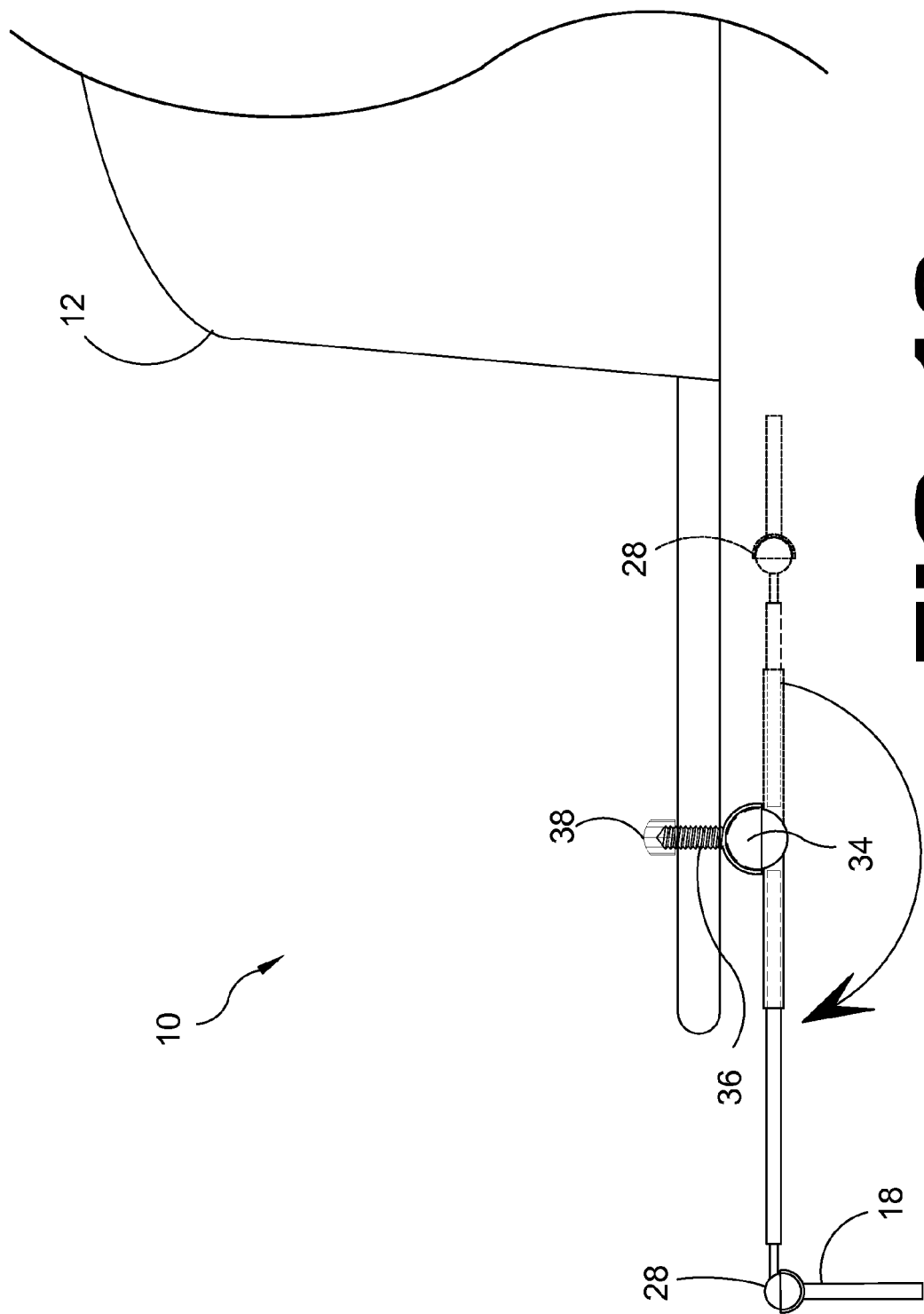

HAT BRIM WITH REARVIEW MIRRORS

BACKGROUND OF THE INVENTION

1. Field of the Invention

The present invention relates generally to mirrors and, more specifically, to a hat having rearview mirrors. The rearview mirror and hat with device permanently affixed that allows hunters to view any game behind them without having to startle them through movement. The rearview mirror is an integral part of the brim of the hat, the telescopic arm is extended and the mirror is rotated to the desired angle. The telescopic arm provides for extending the mirror past any obstructions for maximum vision behind hunter while sitting in a tree stand or any hunting blind.

2. Description of the Prior Art

There are other mirror devices designed for rearward viewing While these devices may be suitable for the purposes for which they where designed, they would not be as suitable for the purposes of the present invention as heretofore described.

It is thus desirable to provide a hat brim mountable mirror that is extendable and retractable and pivotal to a desired mirror angle.

SUMMARY OF THE PRESENT INVENTION

A primary object of the present invention is to provide a hat with rearview mirrors forming an integral part to view game behind a user without turning around.

Another object of the present invention is to provide a hat with rearview mirrors pivotally mounted to the hat brim.

Yet another object of the present invention is to provide a hat with rearview mirrors having a telescopic arm portion comprising nested sleeve segments.

Still yet another object of the present invention is to provide a hat with rearview mirrors having a mirror pivotally mounted to said telescopic arm portion.

Another object of the present invention is to provide an additional element of mirror and telescopic arms are rotatable about a threaded nut and cap.

Still yet another object of the present invention is to provide said additional element wherein said telescopic arm portion is extendable and retractable from a housing portion.

Additional objects of the present invention will appear as the description proceeds.

The present invention overcomes the shortcomings of the prior art by providing a hat having rearview mirror. The rearview mirror and hat with device permanently affixed that allows hunters to view any game behind them without having to startle them through movement. The rearview mirror is an integral part of the brim of the hat, the telescopic arm is extended and the mirror is rotated to the desired angle. The telescopic arm provides for extending the mirror past any obstructions for maximum vision behind hunter while sitting in a tree stand or any hunting blind.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 10 is a side view of the brim attachable rearview mirror rotated and extended.

DESCRIPTION OF THE REFERENCED NUMERALS

Figure 1:
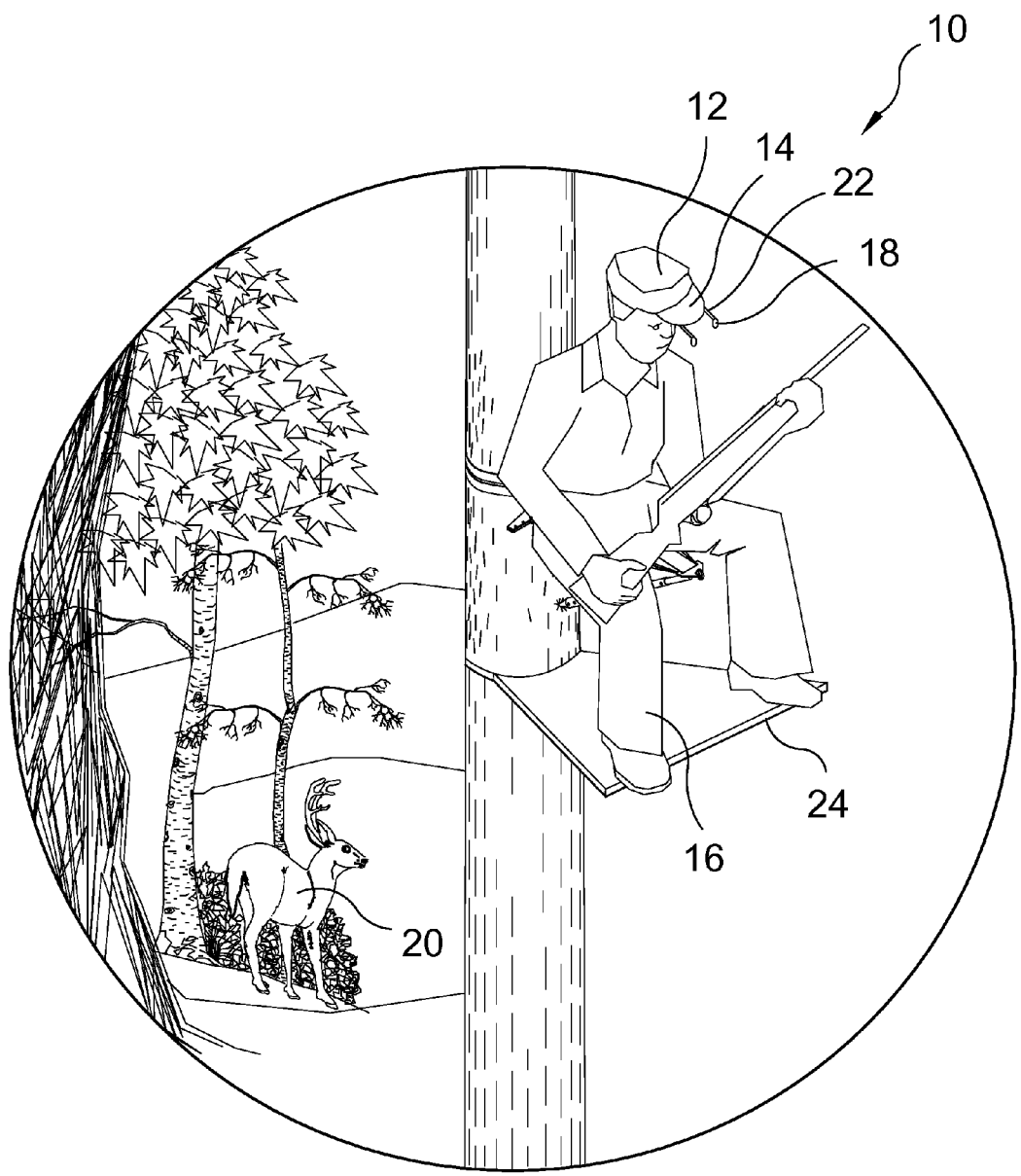
FIG. 1 is an illustrative view of the present invention in use.

Turning now descriptively to the drawings, in which similar reference characters denote similar elements throughout the several views, the figures illustrate the Adjustable Rear View Mirrors for the Brim of a Hat of the present invention. With regard to the reference numerals used, the following numbering is used throughout the various drawing figures.

- 10 Adjustable Rear View Mirrors for the Brim of a Hat of the present invention
- 12 hat
- 14 brim of 12
- 16 hunter
- 18 rear view mirror
- 20 game
- 22 telescopic arm
- 24 tree stand
- 28 ball joint
- 30 LED
- 32 illuminable member
- 34 central ball joint
- 36 threaded post
- 38 cap
- 40 aperture

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention in use. Shown is the telescoping, pivoting rearview mirror device for hats 10 permanently or temporarily affixed to the bill 14 of a cap 12 that allows hunters 16 to view any game 20 behind them without having to startle the game through movement. The rearview mirror 18 is an integral part of the bill 14 or brim of the cap 12, the telescopic arm 22 is extended and the mirror 18 is rotated to the desired angle. The telescopic arm 22 provides for extending the mirror 18 past any obstructions for maximum vision behind hunter 16 while sitting in a tree stand 24 or any hunting blind.

Figure 2:
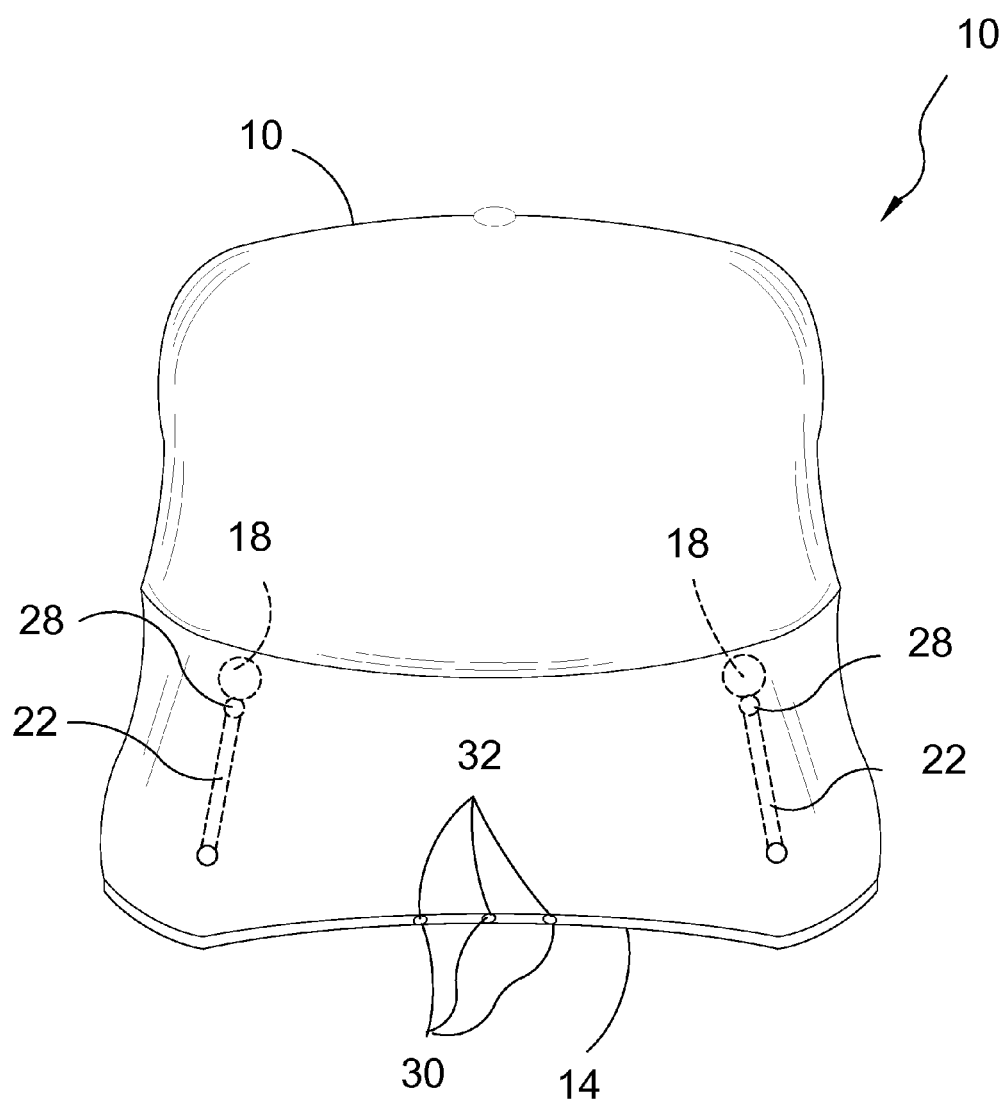
FIG. 2 is a perspective view of the hat brim rearview mirror.

FIG. 2 is a perspective view of the telescopic pivoting rearview mirrors device for hats 10 integrally mounted on a hat brim 14. Shown is the hat rearview mirror 18 permanently attached to the brim's right and left side with the mirrors 18 pivotal and mounted to the bill 14 of the cap 12 with the telescopic arms 22. The pivotal members connecting mirrors 18 to the telescopic arms are ball joints 28 for adjusting the mirror angle with the telescopic arms 24 provided for extending and retracting the mirror 18. The present invention also provides that the brim 14 may include one or more illuminable elements 30 positioned on the edge thereof depicted here as LED lights 32.

Figure 3:
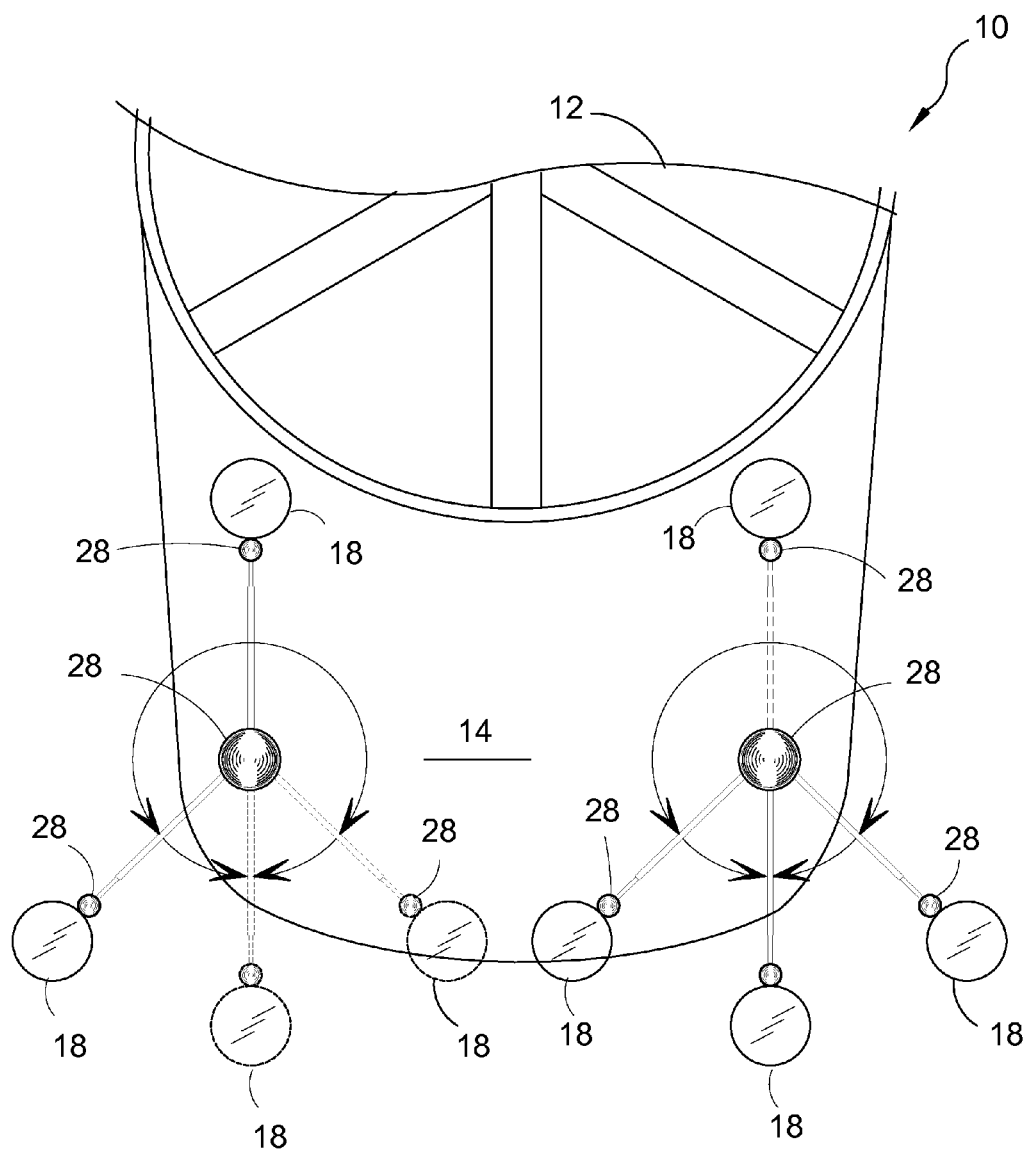
FIG. 3 is a bottom view of the hat with integral rearview mirrors.

FIG. 3 is a bottom view of the telescoping, pivoting rearview mirrors for hats device for hats 10. Shown is a bottom view of the hunter's hat 12 having left and right rearview mirrors 18 permanently attached to the brim 14. The telescopic arms 22 are attached to the brim 14 by ball joint 28 and the mirror 18 employs ball joints 28 provides for moving the mirrors 18 to and from the brim 14 and left and right across the brim 14. The telescopic members 22 provides for selectively extending the respective mirror's 18 viewing angle.

Figure 4:
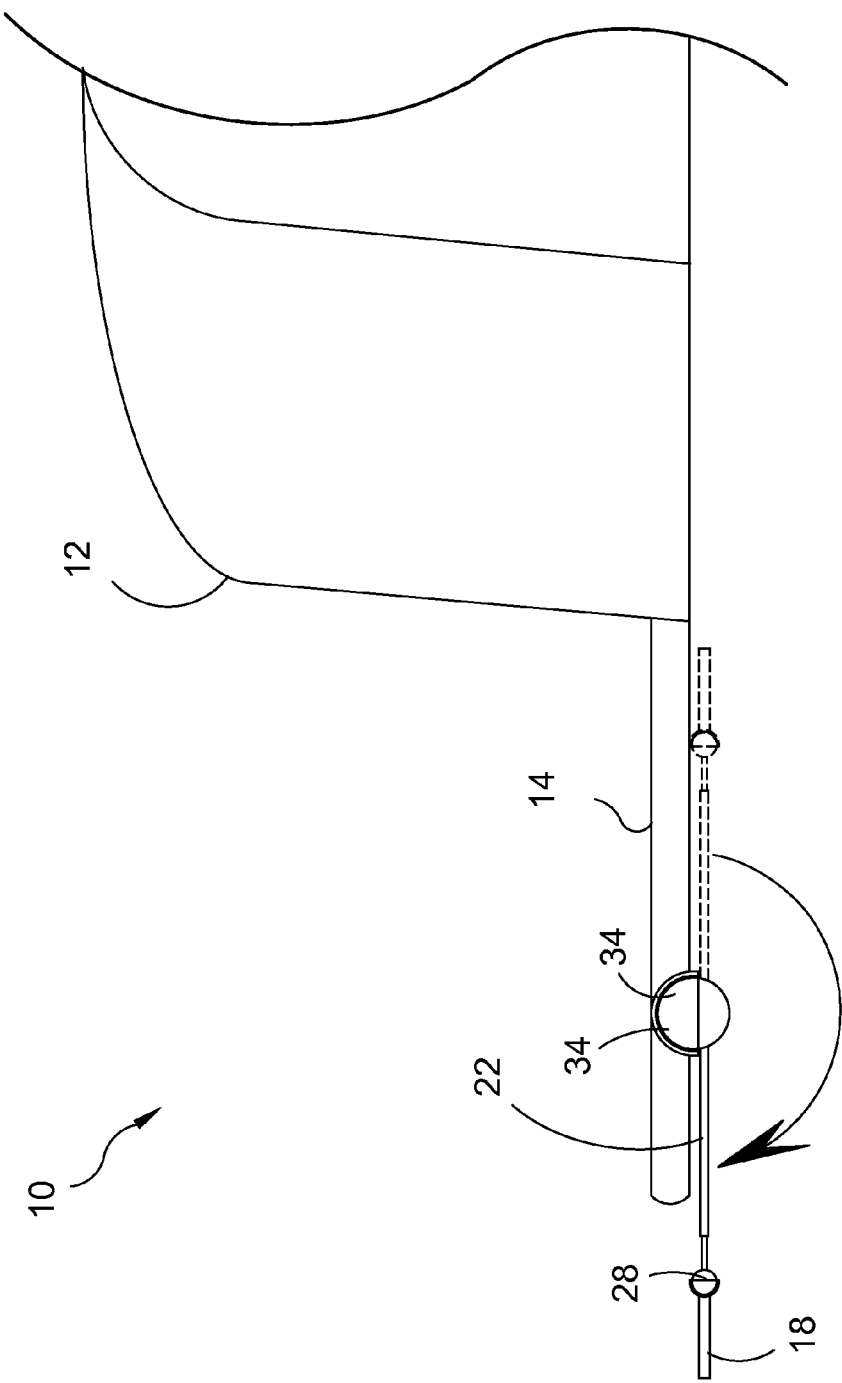
FIG. 4 is a side view of the hat with rearview mirror.

FIG. 4 is a side view of the integral telescoping, pivoting rearview mirror for hats 10. The hat 12 with rearview mirror 18 provides for extending the mirror 18 past any obstructions and pivoting the mirror 18 to a desired angle. Shown is a central ball joint 28 forming an integral part of the hat brim 14 having a telescopic arm 22 extending therefrom and terminating in another ball joint 28 having the mirror 18 pivotally attached thereto.

Figure 5:
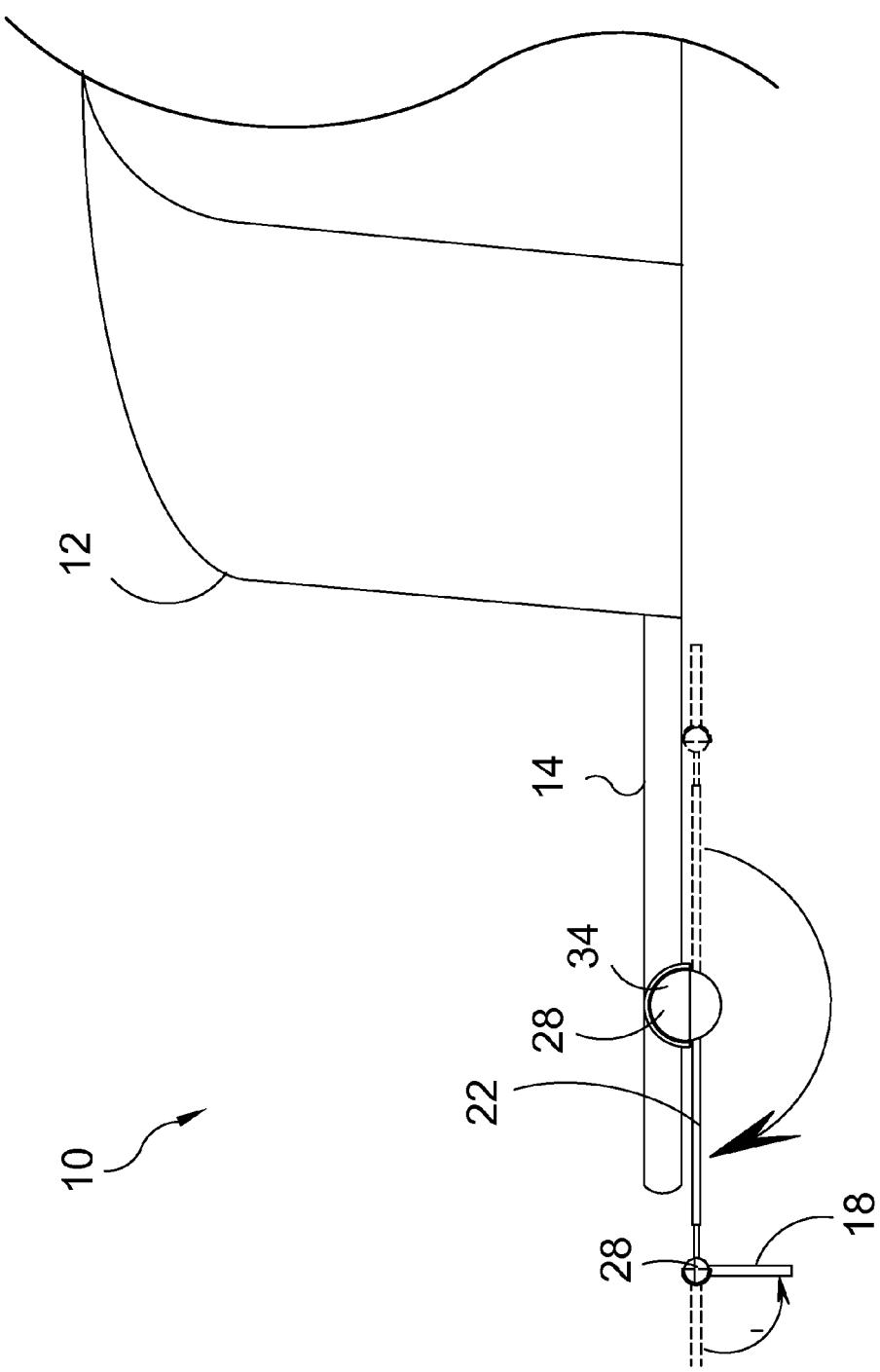
FIG. 5 is a side view of the hat with rearview mirror pivoted.

FIG. 5 is a side view of the integral telescoping, pivoting rearview mirror for hats 10 with the mirror 18 pivoted. The hat 12 with rearview mirror 18 provides for extending the mirror 18 past any obstructions and pivoting the mirror 18 to a desired angle. Shown is a central ball joint 28 forming an integral part of the hat brim 14 having a telescopic arm 22 extending therefrom and terminating in another ball joint 28 having the mirror 18 pivotally attached thereto.

Figure 6:
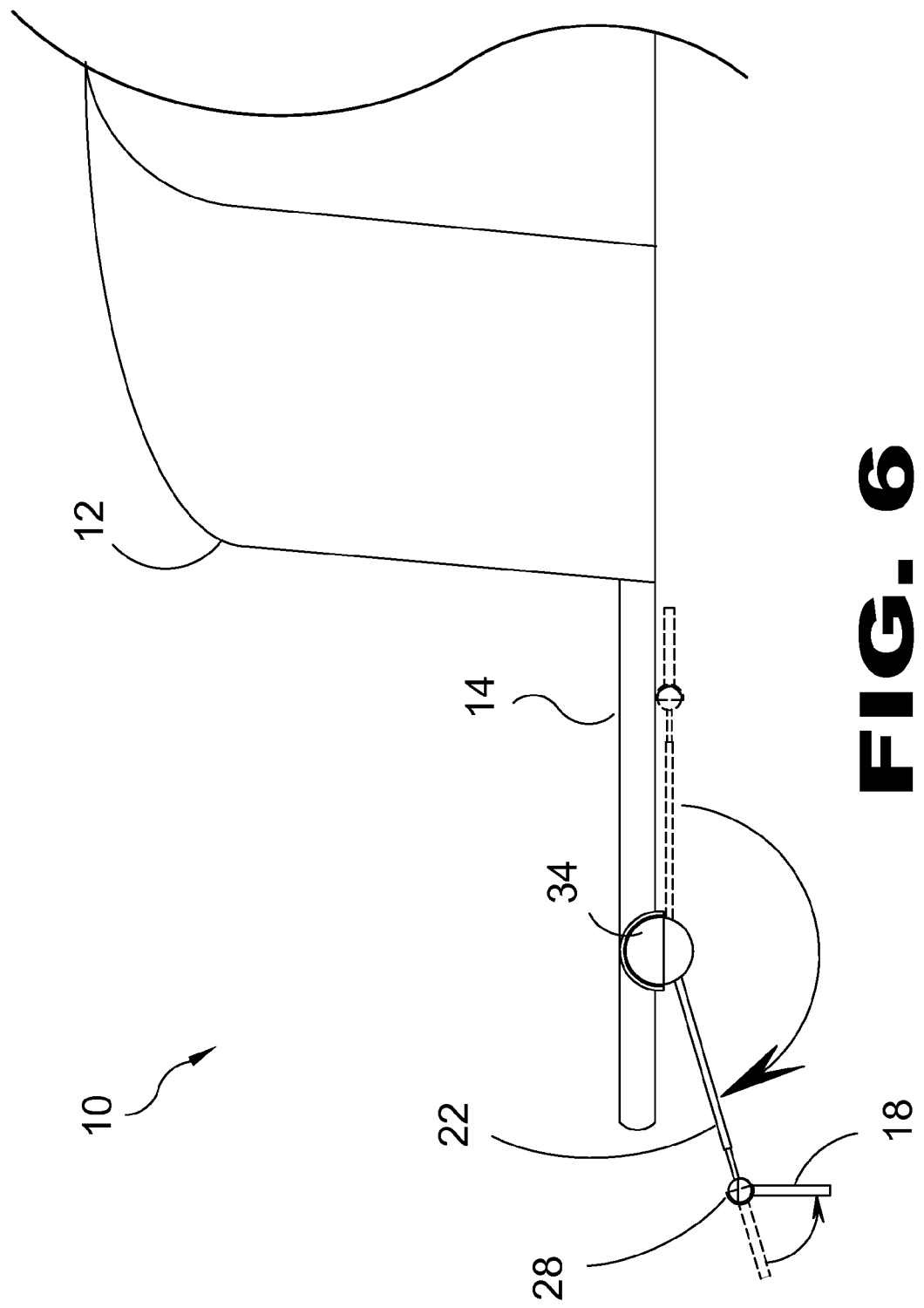
FIG. 6 is a side view of the hat with rearview mirror pivoted through both ball joints.

FIG. 6 is a side view of the integral telescoping, pivoting rearview mirror for hats 10. The hat 12 with rearview mirror 18 provides for extending the mirror 18 past any obstructions and pivoting the mirror 18 is the central ball joint 34,28 swung to a desired angle. Shown is the central ball joint 34,28 forming an integral part of the brim 14 of the hat 12 having a telescopic arm 18 extending therefrom and terminating in another ball joint 28 having the mirror 18 pivotally attached thereto.

Figure 7:
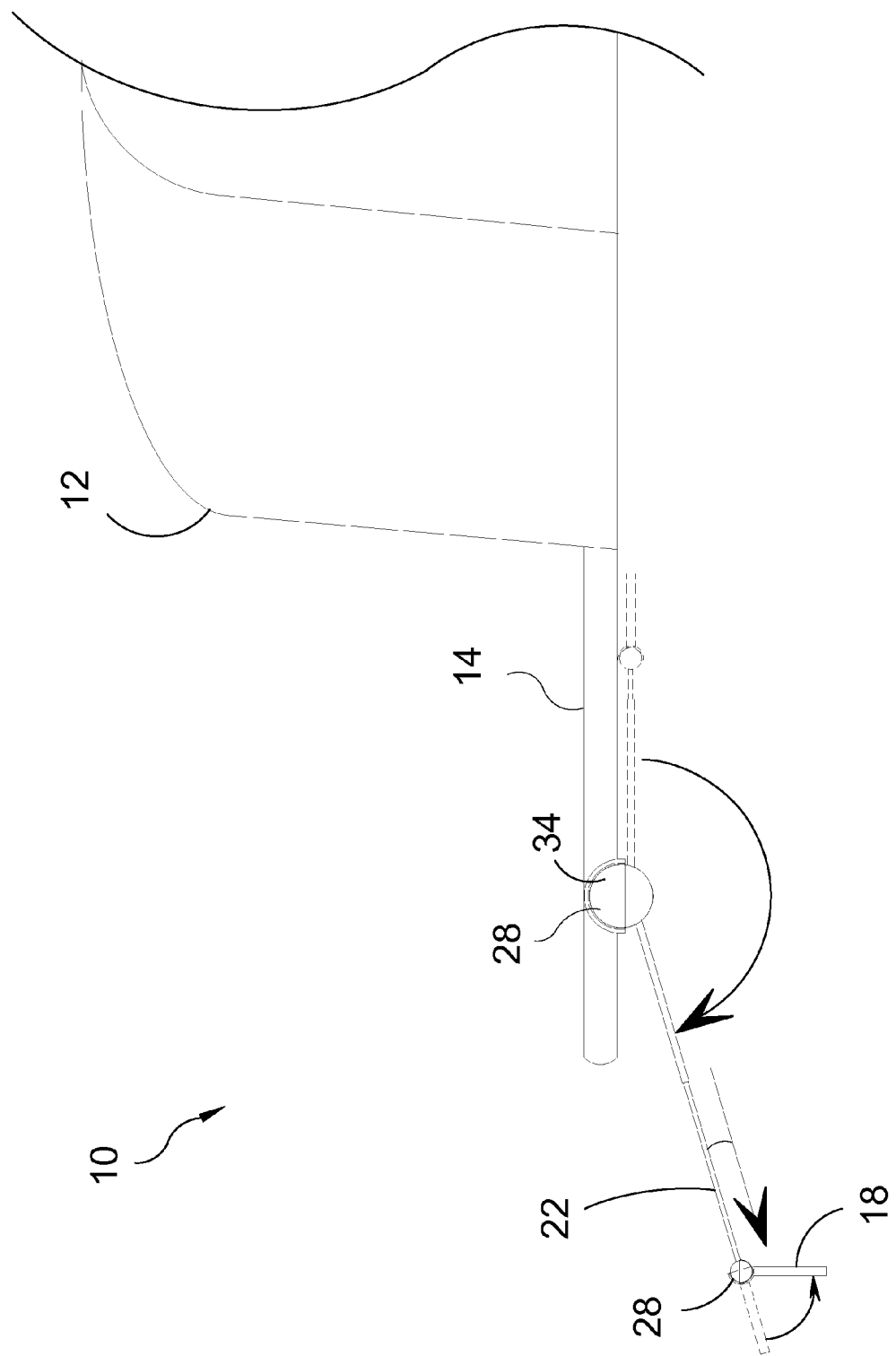
FIG. 7 is a side view of the hat with rearview mirror pivoted through both ball joints and extended.

FIG. 7 is a side view of the integral telescoping, pivoting rearview mirror for hats 10 with rearview mirror 18 pivoted through its central ball joint 28, and telescopic arm 22 extended. The hat 12 with rearview mirror 18 provides for extending the mirror 18 past any obstructions and pivoting the mirror 18 to a desired angle. Shown is a central ball joint 34 forming an integral part of the hat brim 14 having a telescopic arm 22 extending angularly downward therefrom and terminating in another ball joint 28 having the mirror 18 pivotally attached thereto.

Figure 8:
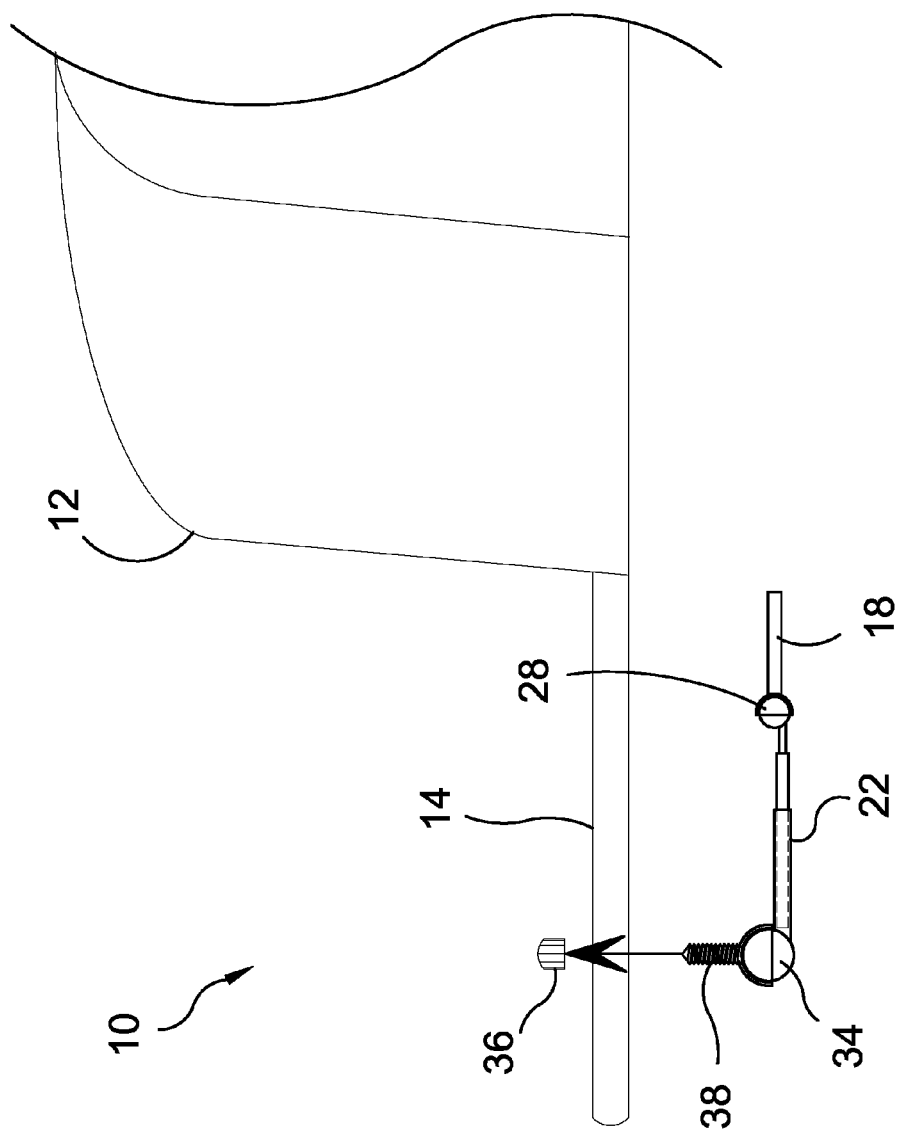
FIG. 8 is a side view of an additional element of the present invention.

FIG. 8 is a side view of an additional element is a side view of the integral telescoping, pivoting rearview mirror for hats 10 of the present invention. The present invention provides the additional element of a brim 14 attachable rearview mirror 18 for an existing hat 12 comprising a threaded post 36 attached to a central ball joint 34 with mating cap 38 having the telescopic arm 22 attached thereto so that the mirror 18 can be rotated by the ball joint 28 once secured to the hat brim 14.

Figure 9:
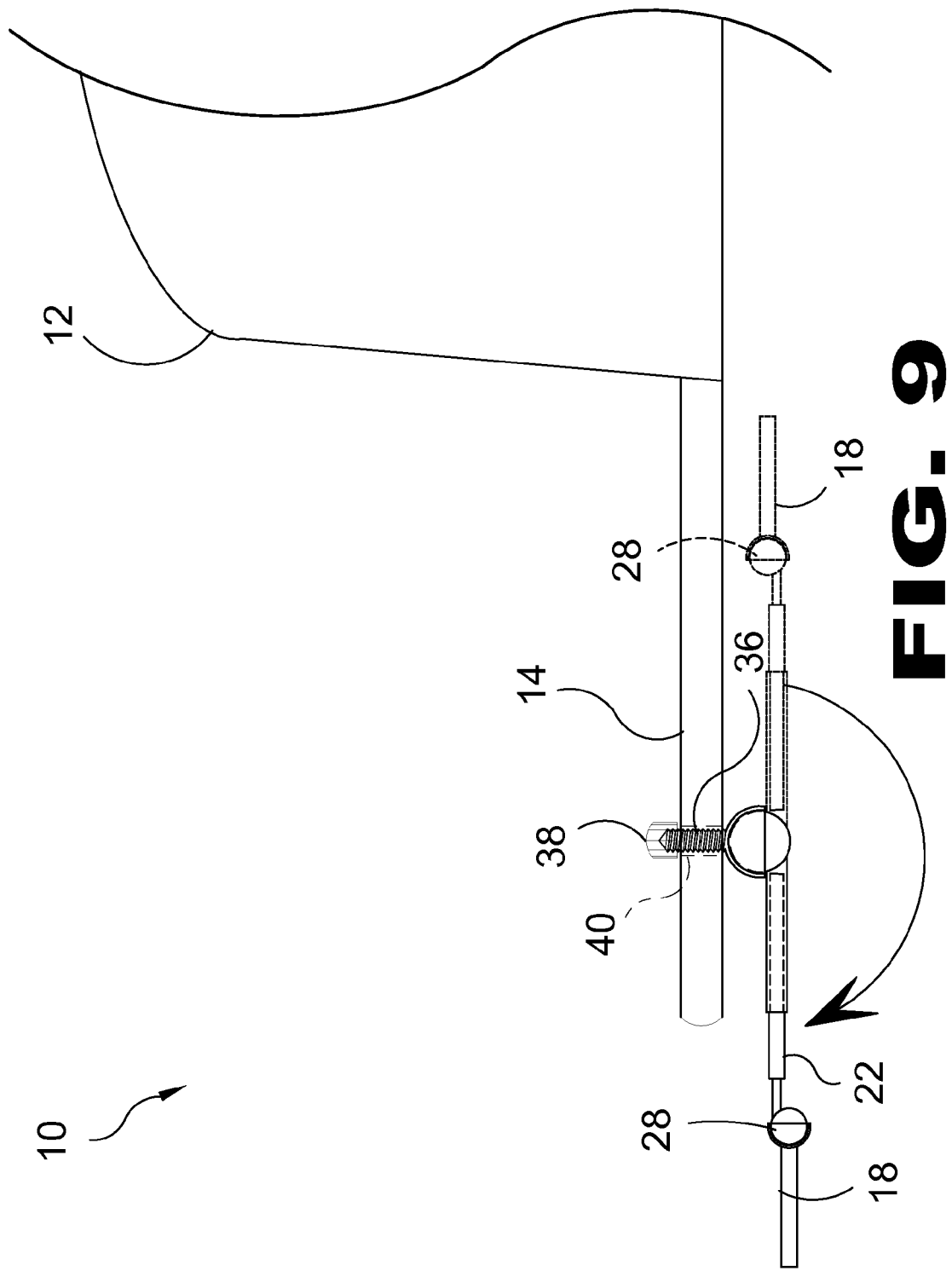
FIG. 9 is an illustrative view of the brim attachable rearview mirror.

FIG. 9 is a side view of the removable telescoping, pivoting rearview mirror for hats 10. Shown is the brim 14 attachable rearview mirror 18 attached to the brim 14 of an existing hat 12 with threaded post 36 that pass through an aperture 40 in the brim 14 so that a user can extend or retract the telescopic arm 22 and rotate the rearview mirror 18 to the front of the brim 14 and rotate the mirror 18 on it's ball joint 28 to a desired angle for maximum vision behind the hunter while sitting in a tree stand or any hunting blind.

FIG. 10 is a side view of the removable telescoping, pivoting rearview mirror for hats 10 with the rearview mirror 18 rotated and extended. The hat 12 with rearview mirror 18 provides for extending the mirror past any obstructions and rotating the mirror 18 on its ball joint 28 to a desired angle for maximum vision behind the hunter while sitting in a tree stand or any hunting blind. The central ball joint 34 is secured to the brim 14 with a threaded post 36 and cap 38.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A pair of adjustable arms with rear view mirrors extending from opposing sides of the brim of a hat to provide the user with 360 degree field of vision comprising:
   a) a pair of opposing arms having a first end and a second end, and each arm having a telescopic arm portion;
   b) said mirrors disposed on ball joints on said second ends of said arms wherein said rear view mirrors are pivotable; and
   c) a central ball joint for attaching each said first end of said arms to opposing sides of an underside of said brim wherein said arms are pivotable about said central ball joints and telescoped to positions along said underside of said brim away from any outer edge of said brim, each said central ball joint having a threaded post projecting upward therefrom, a mating threaded cap for each said threaded post, and each threaded post extending through said brim and a portion exposed on top of said brim receives a cap to secure said arms to said brim, whereby said arms with mirrors attached are positioned on said underside of said brim so that said arms and mirrors are not visible from above an upper surface of said brim when said mirrors are not deployed.

2. The pair of adjustable arms with rear view mirrors for hats according to claim 1, wherein said opposing arms each comprise a tube slidably inserted within a tube to provide the arms with telescopic properties.

3. The pair of adjustable arms with rear view mirrors for hats according to claim 2, wherein said telescopic arms pivot upward and downward and swivel side to side.

4. The pair of adjustable arms with rear view mirrors for hats according to claim 1, wherein a plurality of illuminable members are disposed at a front edge of said brim.

5. The pair of adjustable arms with rear view mirrors for hats according to claim 4, wherein said illuminable members are LEDs.

* * * * *